May 8, 1928.

F. L. BOYD

PIPE GRIP

Filed Nov. 19, 1925

1,669,322

WITNESSES

INVENTOR
F. L. Boyd,
BY
ATTORNEYS

Patented May 8, 1928.

1,669,322

UNITED STATES PATENT OFFICE.

FRANK L. BOYD, OF CAT CREEK, MONTANA, ASSIGNOR TO RAYMOND L. COOK, OF SHELBY, MONTANA, AND E. B. COOLIDGE, OF LEWISTOWN, MONTANA.

PIPE GRIP.

Application filed November 19, 1925. Serial No. 70,146.

My present invention relates generally to pipe grips and more particularly to that type of pipe grip usually embodying a single metallic member provided upon its inner face with a transversely toothed concave and having at its opposite ends rope engaging means, the means at one end being in the nature of a rope anchoring eye and the means at the other end being in the nature of a hook or horn over which a portion of the rope is movable. Considerable objection has developed in the practical use of a pipe grip of the above type, and due to the fact that the grip actuating rope, one end of which is engaged by a casing pole, is subjected to a great deal of friction in its passage over the horn or hook and frequently becomes stiff and unyielding to such an extent as to defeat that free and ready movement which is essential to continuously proper operation of the grip.

In carrying out the primary aim of my invention to overcome the difficulties in the above respect my invention proposes the doing away with the horn or hook at one end of the pipe grip and the substitution therefor of a readily rotatable rope engaging roller, mounted upon a reduced portion of the pipe grip and not only held against danger of accidental displacement but also provided with a relatively wide outer flange adapted to avoid danger of displacement of the rope from the roller in its alternate tightening and loosening movements.

In the accompanying drawing which illustrates my invention and forms a part of this specification:—

Figure 1:
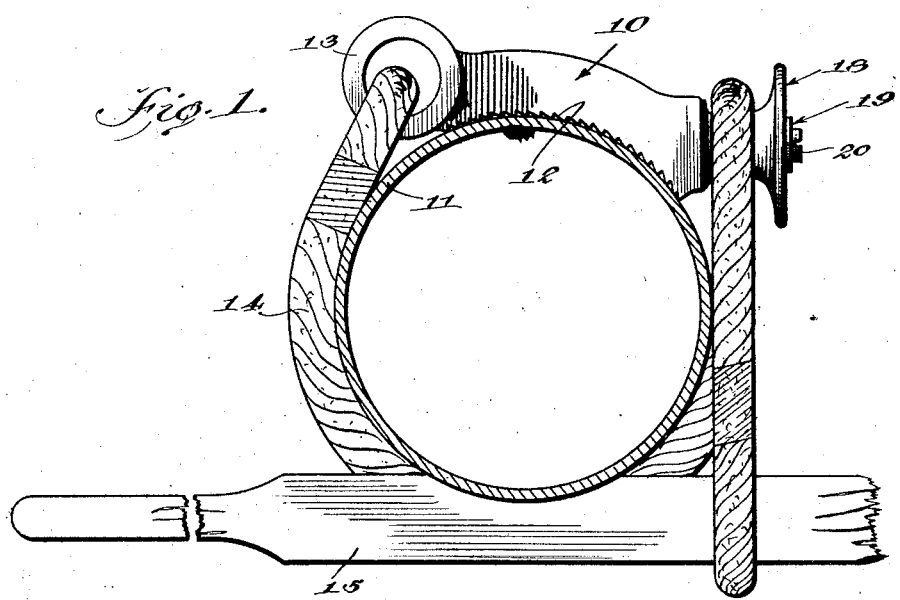
Figure 1 is a sectional side view illustrating the practical application of my invention.

Referring now to these figures, I have shown a pipe grip at 10, the body of which is similar to that ordinarily used as a grip for a casing or tube 11. For this purpose the body of the pipe grip has its inner surface provided with a transversely toothed and concave casing gripping surface 12, and is provided at one end with an eye 13 serving as an anchor for one end of the casing or tube encircling rope 14, whose opposite end is engaged by a casing pole 15 after passage of the rope over the opposite end of the pipe grip.

Figure 2:
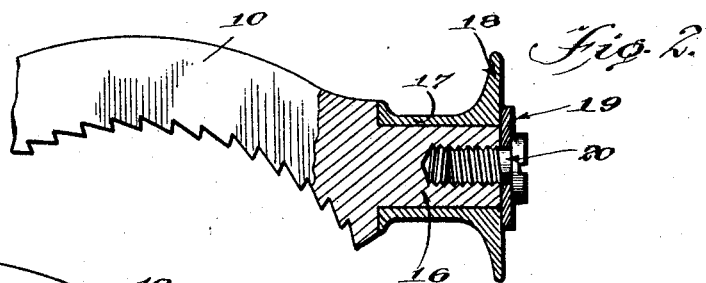
Figure 2 is a partial side view of the pipe grip with its roller and roller mounted end broken away and in section, and, Figure 3 is a detailed perspective view of the parts shown in Fig. 2.
Figure 3:
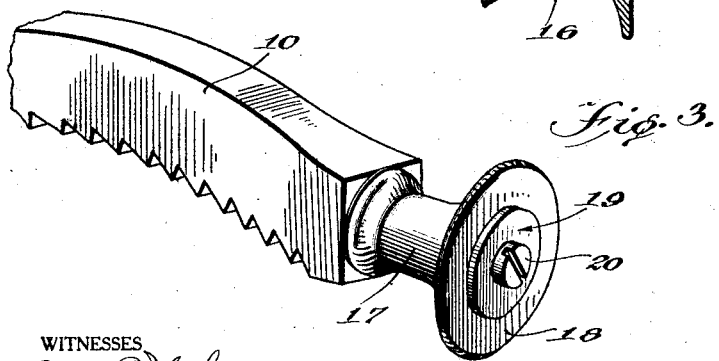

In accordance with my invention the last mentioned end of the pipe grip 10 as most plainly shown in Fig. 2, has a reduced extension 16, which is axially bored and threaded, and the surface of which forms a bearing for a rope engaging guide roller 17, the latter provided with a relatively wide outer flange 18 whereby the intermediate portion of the casing encircling rope while adapted to freely move by virtue of its engagement with the roller 17, is at the same time prevented from danger of accidental displacement. The roller 17 is held in rotatable relation upon the reduced portion 16 of the pipe grip by virtue of an apertured end disk 19 through which a machine screw 20 is extended into the threaded axial bore of the extension 16. The outer portion of the disk 19 partially overlaps the roller 17 and it is obvious that the latter is thus prevented from all danger of accidental displacement, although its ready disposition upon and removal from the extension of the pipe grip is provided for.

In the practical use of the pipe grip as proposed by my invention I not only overcome the difficulties previously noted with respect to the use of the usual horn or hook, but I also increase effectiveness and efficiency due to the more ready and quickly responsive movements of the grip actuating rope 14 in the alternate tightening and loosening of the latter.

I claim:—

1. A pipe grip comprising an elongated body member having a toothed concave pipe engaging face upon one side, a rope securing element at one end and a reduced cylindrical extension at the other end extending in the general direction of the length of the pipe grip, a tubular roller journalled upon said extension having a narrow inner flange and a wide outer flange, and a rope having its one end connected to the securing element of the said body member and adapted to be extended about a pipe to which the body member may be applied and about the roller whereby with pulling upon the free end of the rope the body member will be brought to tenaciously grip the pipe.

2. A pipe grip including an elongated body member having a serrated concave pipe engaging face upon one side, a rope attaching element at one end, a reduced cylindrical extension at the opposite end of the body and projecting longitudinally thereof and having a central threaded bore, a tubular roller received on the extension having flanges at its opposite ends, the outer one of which being of a greater diameter than the other, a screw threaded in the bore and a washer on the screw and engaging the roller to hold it against longitudinal movement in one direction, and a flexible element attached to the securing element and adapted to be passed around a pipe with which the device is engaged and extended over the roller whereby upon application of manual strain to the free end of the flexible element the body will be brought into clamping engagement therewith.

FRANK L. BOYD.